(12) United States Patent
Sundararaman et al.

(10) Patent No.: US 8,768,705 B2
(45) Date of Patent: Jul. 1, 2014

(54) AUTOMATED AND ENHANCED NOTE TAKING FOR ONLINE COLLABORATIVE COMPUTING SESSIONS

(75) Inventors: Sujatha Sundararaman, Milpitas, CA (US); Sundar Hariharan, Milpitas, CA (US); Anand Hariharan, San Jose, CA (US); Archana Karchalli Raju, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 722 days.

(21) Appl. No.: 12/606,474

(22) Filed: Oct. 27, 2009

(65) Prior Publication Data
US 2011/0099006 A1    Apr. 28, 2011

(51) Int. Cl.
*G10L 21/00* (2013.01)
(52) U.S. Cl.
USPC ............................ 704/270; 704/231; 704/235
(58) Field of Classification Search
USPC ................................ 704/231, 245, 270, 270.1
See application file for complete search history.

(56) References Cited

U.S. PATENT DOCUMENTS

| | | | |
|---|---|---|---|
| 6,959,075 B2 * | 10/2005 | Cutaia et al. | 379/202.01 |
| 6,978,001 B1 | 12/2005 | Shaffer et al. | |
| 7,042,995 B1 | 5/2006 | Praturi et al. | |
| 7,043,008 B1 | 5/2006 | Dewan | |
| 7,213,051 B2 | 5/2007 | Zhu et al. | |
| 7,236,580 B1 | 6/2007 | Sarkar et al. | |
| 7,266,189 B1 | 9/2007 | Day | |
| 7,310,334 B1 | 12/2007 | FitzGerald et al. | |
| 7,310,413 B2 | 12/2007 | McClung et al. | |
| 7,319,745 B1 * | 1/2008 | Firestone | 379/202.01 |
| 7,403,893 B2 | 7/2008 | Huart et al. | |
| 7,461,347 B2 | 12/2008 | Zhu et al. | |
| 7,464,137 B2 | 12/2008 | Zhu et al. | |
| 7,467,210 B1 | 12/2008 | Rao et al. | |
| 7,542,904 B2 | 6/2009 | Chestnut et al. | |
| 7,590,230 B1 | 9/2009 | Surazski | |
| 7,596,103 B2 | 9/2009 | Shaffer et al. | |
| 7,596,131 B1 | 9/2009 | Volftsun et al. | |
| 2004/0161082 A1 * | 8/2004 | Brown et al. | 379/93.21 |
| 2004/0190700 A1 | 9/2004 | Cutaia et al. | |
| 2006/0182232 A1 | 8/2006 | Kerr et al. | |

(Continued)

FOREIGN PATENT DOCUMENTS

| | | |
|---|---|---|
| CN | 101325587 A | 12/2008 |
| CN | 101416472 A | 4/2009 |

OTHER PUBLICATIONS

Young, Lee W., PCT Notification of Transmittal of the International Search Report and the Written Opinion of the International Searching Authority, or the Declaration, PCT International Searching Authority, International Appl. No. PCT/US10/02813, filed on Oct. 21, 2010, document dated Mar. 30, 2011, 9 pages.

(Continued)

*Primary Examiner* — Douglas Godbold

(57) ABSTRACT

In one embodiment, during participation in an online collaborative computing session, a computer process associated with the session may monitor an audio stream of the session for a predefined action-inducing phrase. In response to the phrase, a subsequent segment of the session is recorded, such that a report may be generated containing any recorded segments of the session (e.g., and dynamically sent to participants of the session).

30 Claims, 7 Drawing Sheets

(56) References Cited

U.S. PATENT DOCUMENTS

| | | |
|---|---|---|
| 2007/0022159 A1* | 1/2007 | Zhu et al. ............... 709/204 |
| 2007/0116198 A1 | 5/2007 | Fujita-Yuhas |
| 2007/0206759 A1 | 9/2007 | Boyanovsky |
| 2008/0089489 A1 | 4/2008 | Katkam et al. |
| 2008/0091829 A1 | 4/2008 | Spataro et al. |
| 2008/0120101 A1 | 5/2008 | Johnson et al. |
| 2008/0137558 A1 | 6/2008 | Baird |
| 2008/0165791 A1 | 7/2008 | DeGrazia |
| 2008/0181140 A1* | 7/2008 | Bangor et al. ........... 370/261 |
| 2008/0189624 A1 | 8/2008 | Chotai et al. |
| 2008/0192905 A1 | 8/2008 | Fujita-Yuhas |
| 2008/0255840 A1* | 10/2008 | Cutler ..................... 704/246 |
| 2008/0276159 A1* | 11/2008 | Narayanaswami et al. ... 715/202 |
| 2011/0126126 A1* | 5/2011 | Blair ...................... 715/752 |

OTHER PUBLICATIONS

English Translation of Office Action in counterpart Chinese Application No. 201080016232.6, mailed Oct. 8, 2013. 18 pages.

* cited by examiner

RECORDINGS
500
A.
AUDIO: 
TEXT: GET THESE FILES FROM COUNSEL
OWNER: JOHN DOE
IMAGE: 
B.
• • •
• • •
FIG. 5

REPORT
600

| ITEM/NOTE 605 | OWNER 610 | LINKS 615 |
|---|---|---|
| "A" | JOHN | LINK(S) |
| "B" | JANE | LINK(S) |
| "C" | JOHN | LINK(S) |
| ⋮ | ⋮ | ⋮ |

AUTOMATED AND ENHANCED NOTE TAKING FOR ONLINE COLLABORATIVE COMPUTING SESSIONS

TECHNICAL FIELD

The present disclosure relates generally to computer networks, and, more particularly, to online collaborative computing sessions.

BACKGROUND

Online collaborative computing sessions, such as interactive conferences (e.g., web conferences/meetings), may be supported by a computer network having servers distributing content between participating client computers. In particular, the content may be distributed based on one or more sub-sessions, such as a desktop sharing session, chat session, video session, etc. For example, a presenter may share the images on his or her computer screen with one or more attendees to the session, such as by sharing the entire desktop (screen) or certain applications on the screen, along with audio (e.g., speech). Control of the session (who is presenting) may be exchanged among the attendees, to either present their own information, or to control the information on the original presenter's (e.g., host's) computer.

During the course of an online collaborative computing session, just as in conventional in-person meetings, it is often helpful to take notes or "action items" (e.g., "to-do" lists, etc.). Generally, an attendee of the meeting is tasked with manually taking the notes during the meeting, and distributing the notes to the other attendees at the conclusion of the meeting. This manual technique is inconvenient for the note-taker, and may create incomplete or inaccurate notes.

BRIEF DESCRIPTION OF THE DRAWINGS

The advantages of the embodiments herein may be better understood by referring to the following description in conjunction with the accompanying drawings in which like reference numerals indicate identically or functionally similar elements, of which:

FIG. 5 illustrates example note recordings.

DESCRIPTION OF EXAMPLE EMBODIMENTS

Overview

According to one or more embodiments of the disclosure, during participation in an online collaborative computing session, a computer process associated with the session (e.g., on a client device or on a server for the session) may monitor an audio stream of the session for a predefined action-inducing phrase. In response to the phrase, a subsequent segment of the session is recorded (e.g., audio, video, text, etc.), such that a report may be generated containing any recorded segments of the session. For example, according to certain embodiments of the disclosure, the dynamically recorded segments may be transmitted (e.g., emailed) to the participants of the session, such as sending particular action items to particular owners of the action items.

DESCRIPTION

Architecture for Collaborative Computing Sessions

Figure 1:
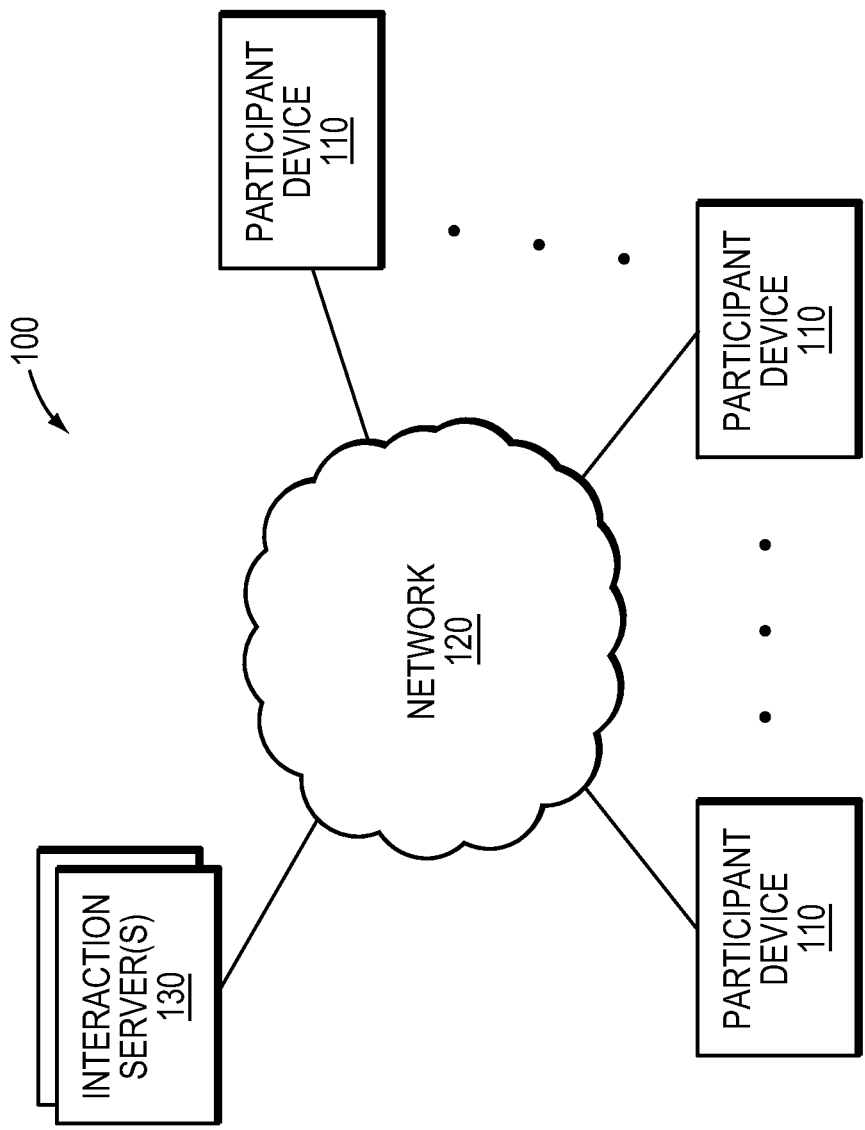
FIG. 1 illustrates an example computer network.

FIG. 1 is a schematic block diagram of an example computer network 100 illustratively comprising nodes/devices, such as one or more participant/client devices 110 and one or more interaction servers 130 interconnected by links/network 120 as shown and as described further herein. For instance, participant devices, as described below, may be a personal computer (PC) or one or more peripheral devices, such as phones, etc. Those skilled in the art will understand that any number of nodes, devices, links, etc. may be used in the computer network, and that the view shown herein is for simplicity.

In this environment, a number of participants may interact in an online, interactive, or collaborative setting. Such a setting can be for a meeting, training or education, support, or any other event that may require a number of participants to work together, interact, collaborate, or otherwise participate, such as web conferences, online meetings, etc. As used herein, the phrase "collaborative computing session" may be used to describe these settings/events, particularly where a number of participant computers/devices collaborate in an established session, as may be appreciated by those skilled in the art. Also, as used herein, a "session" describes a generally lasting communication between one or more participant devices 110 through the interaction server 130. Those skilled in the art will understand that the session may be implemented/established using protocols and services provided by various layers (e.g., application, session, and/or transport layers) of a network protocol stack according to the well-known OSI model. Conversely, a "meeting" describes a personal layer of communication overlaid upon the session where participants/users communicate with each other. Moreover, while the terms "session" and "meeting" may generally be used interchangeably herein to denote a collaboration of people or devices, particular instances of their use may denote a particular distinction (e.g., a session may start with attendees joining/connecting to the servers, while a meeting may not start until a host/presenter joins the session), as may be understood by those skilled in the art.

In particular, each participant (e.g., hosts/presenters and/or attendees) may operate a participant device 110. Each participant device (or client device, herein) 110 may comprise an electronic device with capability for visual and/or auditory presentation. Thus, a participant device 110 can be, for example, a desktop personal computer (PC), a laptop computer, a workstation, a personal digital assistant (PDA), a wireless telephone, a smart phone, an Internet television, and the like. Each participant device 110 supports communication by a respective participant, in the form of suitable input device (e.g., keyboard, mouse, stylus, keypad, etc.) and output device (e.g., monitor, display, speech, voice, or other device supporting the presentation of audible/visual information). Each participant device may be interconnected with a suitable communications network 120 such as, for example, the Internet, and may appear as a client computer thereon.

In one embodiment, each participant device 110 may operate under the control of a suitable operating system (OS) (e.g., WINDOWS, UNIX, etc.) to run software applications (e.g., in the form of code modules) which may be installed, received, or downloaded. At least some of these software applications may support specific functions, such as, for example, functions related to the online, interactive meeting (a collaborative computing session), such as conventional web browser programs that allow convenient access and navigation of the Internet (e.g., the World Wide Web).

The online meeting (collaborative computing session) of the various participants may be supported by an interaction server 130 which may be maintained or operated by one or more of the participants and/or a third-party service provider. The interaction server 130 may be a computer system that is connected to network 120, and which may comprise and appear as one or more server computers thereon. Interaction server 130 may store information (e.g., content) and application modules which can be provided to the participant devices 110. In some embodiments, these application modules are downloadable to the participant devices 110 and may support various functions that may be required for an interactive meeting or collaborative effort among the participants. The participant devices 110 and the interaction server 130 may interact in a client/server architecture, which may provide high performance and security for a multi-participant collaborative environment.

Network 120 may comprise or be supported by one or more suitable communication networks, such as, for example, a telecommunications network that allows communication via one or more telecommunications lines/channels. In particular, the communication or data networks, such as the Internet, may be used to deliver content, such as for the collaborative computing sessions herein. The Internet is an interconnection of computer clients and servers located throughout the world and exchanging information according to Transmission Control Protocol/Internet Protocol (TCP/IP), Internetwork Packet eXchange/Sequence Packet eXchange (IPX/SPX), AppleTalk, or other suitable protocol. The Internet supports the distributed application known as the "World Wide Web." Web servers maintain websites, each comprising one or more web pages at which information is made available for viewing and audio/hearing. Each website or web page may be supported by documents formatted in any suitable conventional markup language (e.g., HTML or XML). Information may be communicated from a web server to a client using a suitable protocol, such as, for example, Hypertext Transfer Protocol (HTTP) or File Transfer Protocol (FTP).

Figure 2:
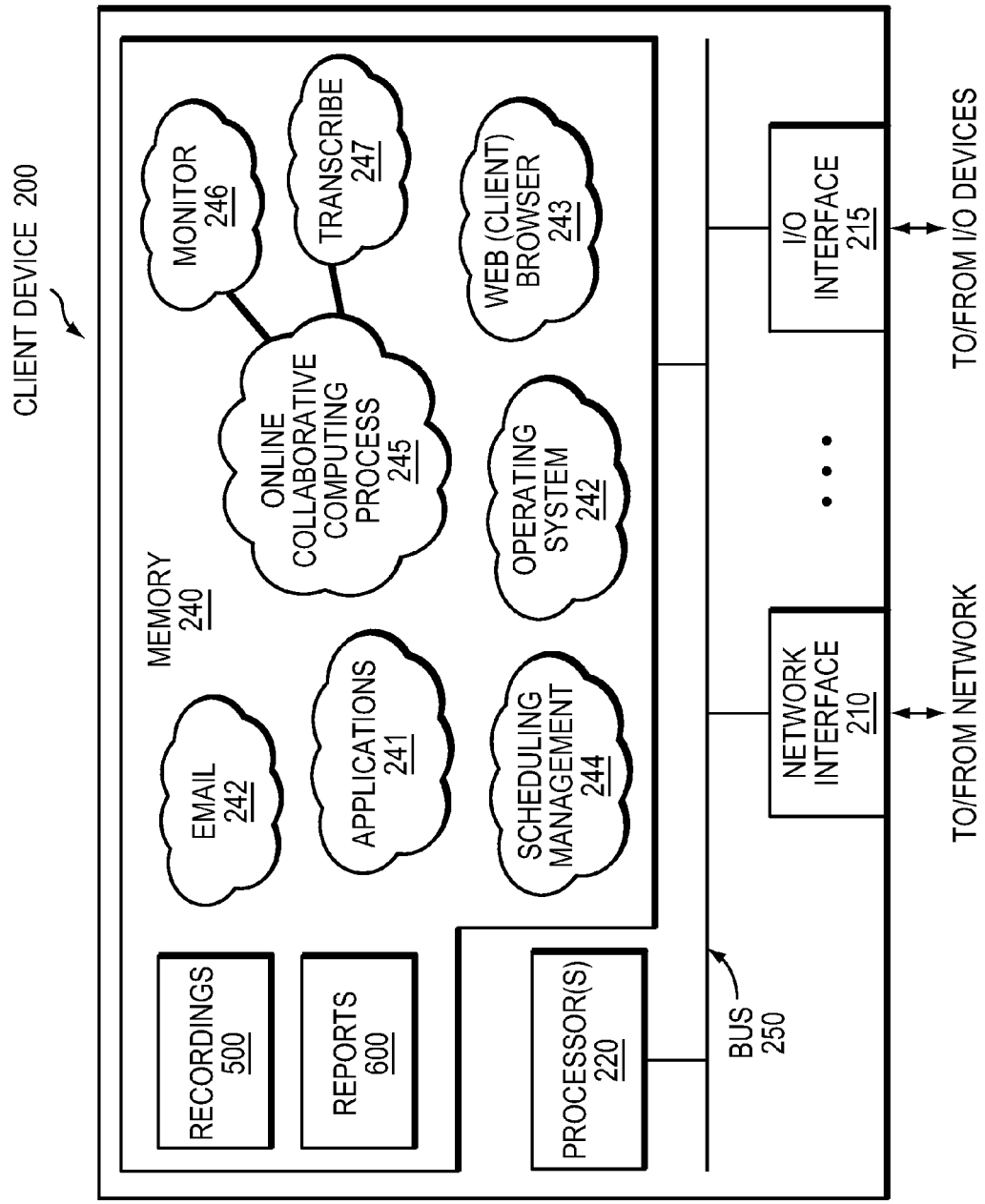
FIG. 2 illustrates an example device/node.

FIG. 2 illustrates a schematic block diagram of an example participant/client device 200 that may be advantageously used with one or more embodiments described herein, e.g., for collaborative computing as participant/client devices 110 (hereinafter device 200 or 110). Illustratively, device 200 may be implemented or incorporated in any suitable computer such as, for example, a personal computer (PC), laptop, workstation, personal digital assistant (PDA), smart phone, mainframe, file server, workstation, or other suitable data processing facility supported by storage (either internal, e.g., electronic memory, or external, e.g., magnetic/optical disk), and operating under the control of any suitable OS.

In particular, the device 200 comprises one or more network interfaces 210, one or more input/output (I/O) interfaces 215, one or more processors 220, and a memory 240 interconnected by a system bus 250. The network interfaces 210 contain the mechanical, electrical, and signaling circuitry for communicating data over physical/wireless links coupled to the network 120. The network interface(s) may be configured to transmit and/or receive data using a variety of different communication protocols suitable for the network. Also, I/O interfaces 215 contain the mechanical, electrical, and signaling circuitry for communicating with one or more user interface devices, such as a mouse, keyboard, monitor/screen, microphone, etc. (not explicitly shown).

The memory 240 comprises a plurality of storage locations that are addressable by the processor(s) 220 and the network interfaces 210 for storing software programs associated with the embodiments described herein. A portion of the memory may (though need not) be arranged as a cache (not shown) configured to store one or more data structures and/or code modules associated with embodiments described herein. The processor(s) 220 may comprise necessary elements or logic adapted to execute the software programs and manipulate the data structures, such as recordings 500 and/or reports 600, as described below. An operating system 242, portions of which are typically resident in memory 240 and executed by the processor(s), functionally organizes the device by, inter alia, invoking operations in support of software processes and/or services executing on the device (e.g., for collaborative computing sessions as is used herein). In particular, these software processes and/or services may comprise one or more applications 241 (e.g., email 242, web browser 243, schedule management applications 244, etc.) as understood by those skilled in the art, and, in particular, an online collaborative computing process 245, as described herein. It will be apparent to those skilled in the art that other types of processors and memory, including various computer-readable media, may be used to store and execute program instructions pertaining to the techniques described herein.

The online collaborative computing process 245 may contain computer executable instructions executed by the processors 220 to generally perform functions to manage or control various processes or aspects during the course of an online meeting or collaborative computing session in which the participant (user) may interact with other users. For instance, an activity manager may manage meeting-related actions (e.g., starting a session, ending a session, locking a session, etc.), manage participant-related actions (e.g., designating a participant as a session host, assigning a participant the presenter privileges, expelling a participant, establishing participant privileges, etc.), manage session-related actions (e.g., starting a sharing session, closing a sharing session, setting privileges within that sharing session, etc.), and support an interface with the user or participant, and provide a container for embedding one or more application code modules.

Also, a communications component of process 245 may support communication between system 200 and an outside network 120 (e.g., the Internet), such as through network interfaces 210. The communications component thus allows data and information to be exchanged with or retrieved from other systems or facilities (e.g., participant devices 200/110 or interaction server 130), for example, during an online meeting or other collaborative computing session. In particular, the communications component may provide a communication platform for any one or more process instances of process 245. For instance, the activity manager may rely on the communications component to establish and maintain the client connection to the interaction server 130 on which the activity session is hosted. Any application code modules (not shown) may also use the established client connection to provide real-time data that is sent and received by is each participant.

Various functionality for supporting a collaborative computing session, such as an online meeting, may be provided by the one or more application code modules, generally described herein as being components of the online collaborative computing process 245. These application code modules may be stored/maintained (e.g., by a cache), and may support, for example, basic communication framework, file sharing (e.g., for text, images, video, audio), remote access, user authentication, meeting scheduling, address book, files and folders, invoices, billing, scheduling, telephone or video conferencing, authentication, database management, word processing, application sharing, accounting, etc. For example, code modules may comprise (not specifically shown) a text-based chat module, a polling module, a video module, a voice over Internet Protocol (VoIP) module, a question-answer (QA) module, a file transfer module, a presentation module, an application/desktop view/share module, and an Internet telephony module.

Figure 3:
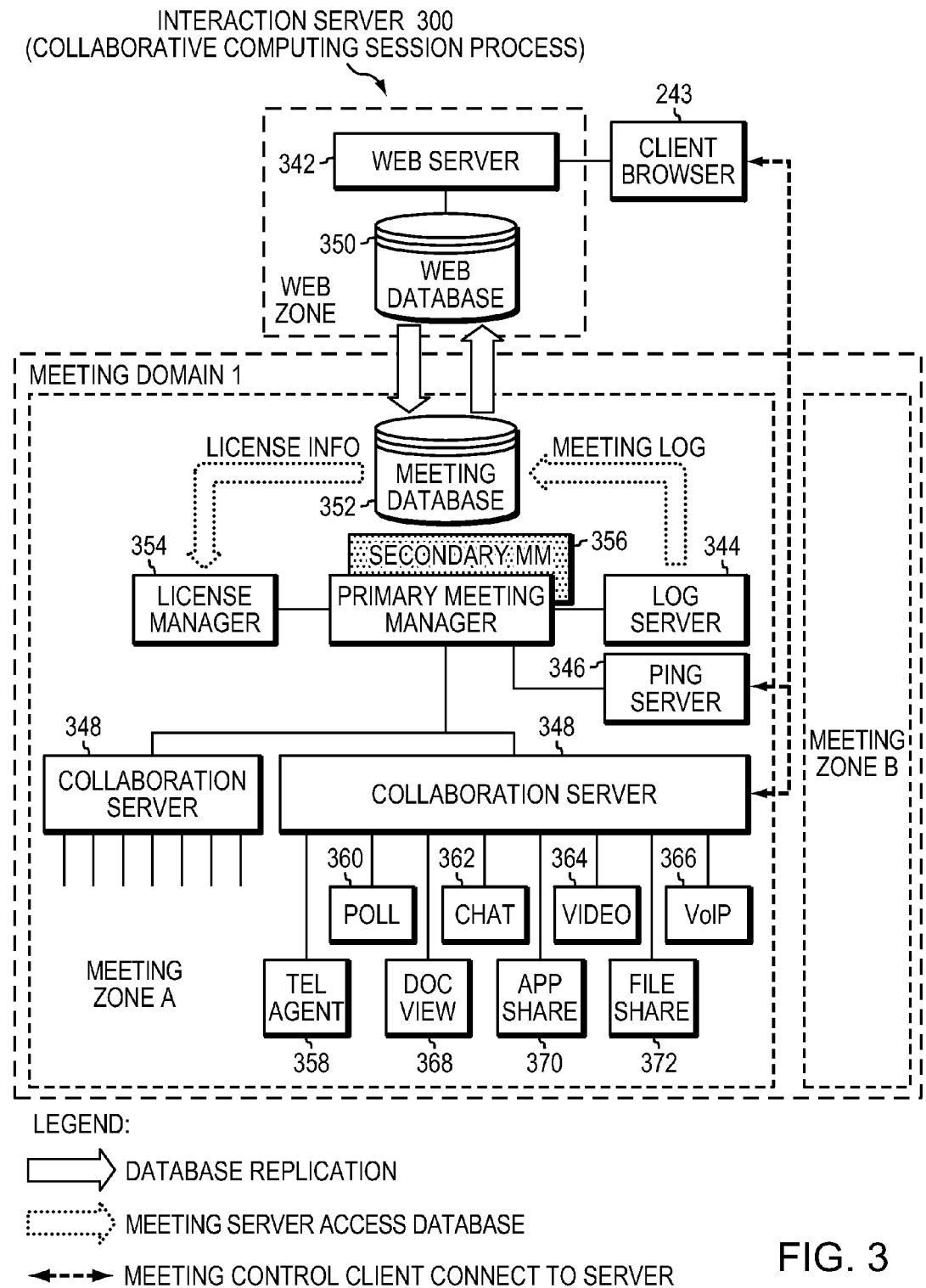
FIG. 3 illustrates an example server arrangement.

FIG. 3 illustrates an example implementation for a computer system 300 that may operate as interaction server 130 according to one or more embodiments described herein (hereinafter referred to as interaction server 300 or 130). Illustratively, in the computer system environment as shown, a number of server computers and databases may be in communication to provide for collaborative meeting or computing. As such, the interaction server 300 and its various components may also be referred to as a collaborative computing process 300. Notably, while the illustrative embodiment described below shows a collection of servers (e.g., localized and/or distributed), a single server may also operate to perform the functions described herein (e.g., collaborative computing process 300). Thus, "interaction server 300" may comprise, either as a single server or as a collection of servers, one or more memories, one or more processors, one or more network interfaces (e.g., adapted to communicate traffic for a collaborative computing session and also traffic on a communication channel other than the collaborative computing session), etc., as may be appreciated by those skilled in the art.

In particular, referring to the environment shown in FIG. 3, a number of processing facilities, including, for example, one or more of a web server 342, a log server 344, a ping server 346, a collaboration server 348, license manager 354, primary and secondary meeting managers 356, application servers (e.g. telephone agent 358, poll 360, chat 362, video 364, voice over IP 366, document view 368, application share 370, and file share 372) may be integrated with a number of data storage facilities, such as, for example, a web database 350 and a meeting database 352 to implement a system for collaborative meetings over the Internet (e.g., for collaborative computing session "process" 300). As depicted, the processing and database facilities of this environment ("process" 300) may be divided into a web zone and one or more meeting zones for interaction with one or more client browsers (which may operate on respective participant devices 200).

A web zone may comprise one or more server machines that share a common web database 350. In the web zone, web server 342 may have a unique IP address (which may be associated with a particular website) and may respond to, e.g., Hyper-Text Transport Protocol (HTTP) requests coming to that IP address from client browser 243. Web server 342 serves or supports web pages, while web database 350 may contain static information for the website including site specific data, web pages, and user data.

Illustratively, a meeting zone is a collection of servers and databases that help perform synchronous activity of an online collaborative meeting. In a meeting zone, the meeting managers 356 may be servers which communicate with other servers in the meeting zone (e.g., collaboration server 348, log server 344, ping server 346, etc.) to keep track of the online meetings in progress in the meeting zone. Meeting managers 356 may log meeting information into meeting database 352. Ping server 346 works with meeting managers 356 to determine a collaboration server 348 that is most suitable for hosting a particular meeting; it may act as a load balancer for the meeting service. Collaboration servers 348 may handle all real time control and communication during an online collaborative meeting. The application servers (e.g., servers 358 through 372) may support specific features that may be available as part of an online collaborative meeting, such as, for example, telephony, polling, chatting, video, voice over IP, document review, recording, transcription, application sharing, and file sharing (e.g., "sub-sessions"). Also, license manager 354 may keep track of and enforce licensing conditions and charges for the meeting. Further, the log server 344 may keep track of meeting logs, and meeting database 352 may maintain at least a portion of the transient data required to conduct and keep track of online meetings. This data may include, for example, site and user information that would be required to establish and conduct a meeting.

In addition, according to one or more embodiments described herein, an online collaborative computing session may comprise one or more "sub-sessions," such as a different sub-session for various components or features of the session itself. For instance, these sub-sessions may comprise, e.g., voice, data, desktop sharing, document sharing (portable document), video, chat, file transfer, remote access, etc. Collaboration between participants may thus be achieved with one or more of the above sub-sessions enabled. For example, if a chat sub-session is enabled then an attendee can send a chat message to one or more other attendees while with desktop sharing sub-session enabled the presenter can share his/her desktop with all attendees, etc.

As noted above, during the course of an online collaborative computing session, just as in conventional in-person meetings, it is often helpful to take notes or "action items" (e.g., "to-do" lists, etc.). Generally, an attendee of the meeting is tasked with manually taking the notes during the meeting, and distributing the notes to the other attendees at the conclusion of the meeting. This manual technique is inconvenient for the note-taker, and may create incomplete or inaccurate notes.

Automated and Enhanced Note Taking

According to one or more embodiments of the disclosure, scribing during an online collaborative computing session (e.g., meeting) may be automated by using specific spoken keywords (or keystrokes) to indicate portions of the session that are to be recorded and reported, such as action items or notes. These recorded portions (or segments) may be used to create action item lists, or "to do" lists, meeting minutes, etc.

Specifically, in one or more embodiments, during participation in an online collaborative computing session, a computer process associated with the session (e.g., on a client device or on a server for the session) may monitor an audio stream of the session for a predefined action-inducing phrase. In response to the phrase, a subsequent segment of the session is recorded (e.g., audio, video, text, etc.), such that a report may be generated containing any recorded segments of the session. For example, according to certain embodiments of the disclosure, the dynamically recorded segments may be transmitted (e.g., emailed) to the participants of the session, such as sending particular action items to particular owners of the action items.

Illustratively, the techniques described herein may be performed by hardware, software, and/or firmware, such as in accordance with online collaborative computing process 245, generally, which may contain computer executable instructions executed by the processor 220 to perform functions relating to the novel techniques described herein, e.g., in conjunction with a monitoring sub-process 246 and transcribe sub-process 247 where appropriate.

Figure 4:
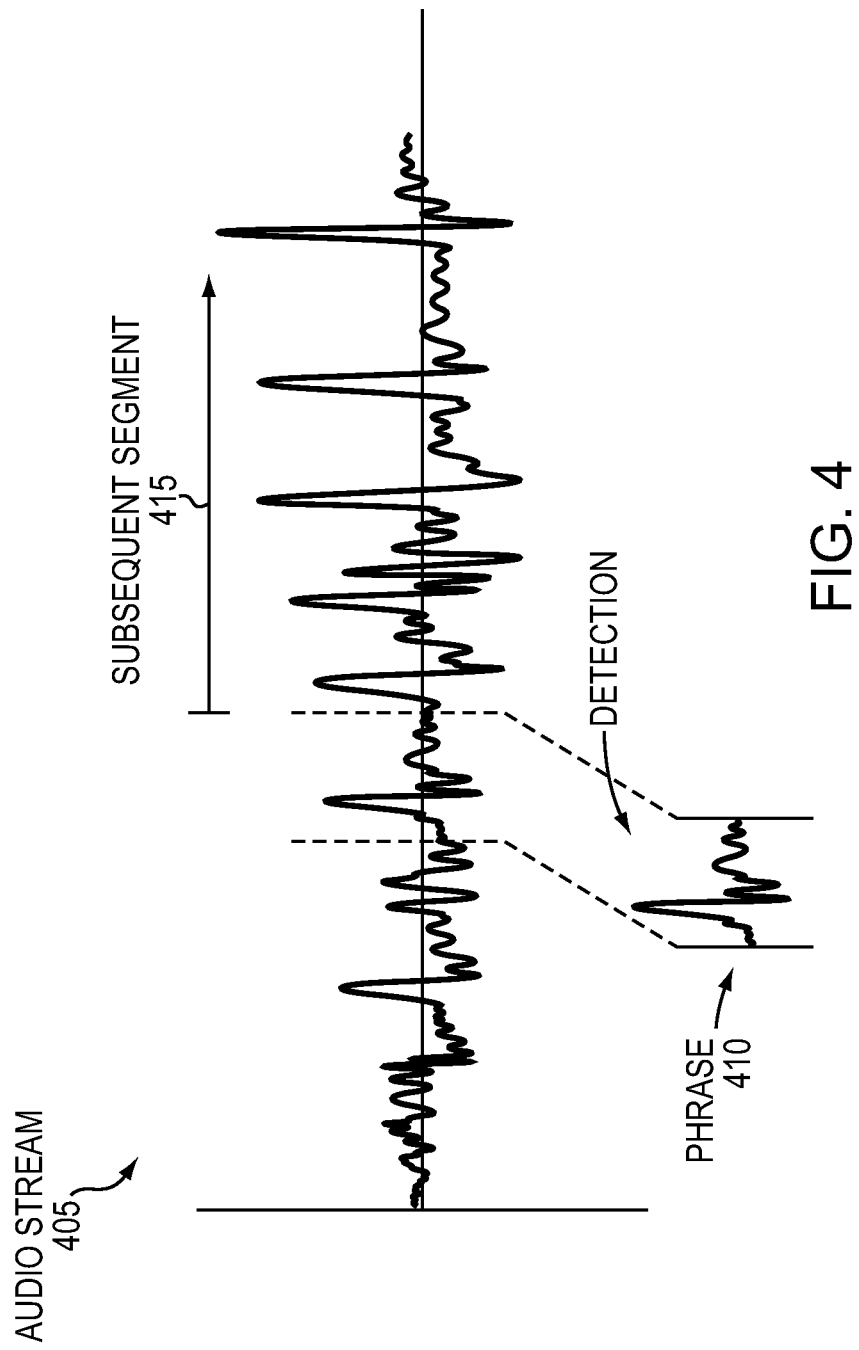
FIG. 4 illustrates an example audio stream.

Operationally, one or more users may participate in an online collaborative computing session via participant devices 110/200. According to one embodiment, a computer process associated with the session (e.g., monitor sub-process 246 of online collaborative computing process 245) may execute on the participant (client) device 200 to monitor a real-time audio stream of the session for a predefined action-inducing phrase. For example, any predefined phrase may be used (e.g., in any suitable language), such as "important note," "action," "action item," "record note," etc. FIG. 4 illustrates an example graphical representation of an audio stream 405, along with a predefined phrase 410 and its representative detection within the stream. The predefined phrases may be limited to several possibilities, thus true voice recognition need not be configured on the monitor process 247 in lieu of general recognition of the standard set of words or commands.

In response to the action-inducing phrase, a subsequent segment 415 of the session may be recorded and stored as a recording 500 (described below). Also, an indication, such as a message, light, sound, etc., may, though need not, be provided during the real-time session to show that the action-inducing phrase was detected and that subsequent recording is taking place.

Notably, as an alternative or in addition to the spoken phrase, certain keystrokes (e.g., shortcut keys, as will be appreciated by those skilled in the art) or clicked icons/buttons on a graphical user interface (GUI) of the meeting may be used to initiate the recording, and such embodiments may also benefit from features described below after having recorded the notes/segments 415. Further, in certain embodiments, a key/button may be pressed and then the audio stream may be monitored for a particular spoken phrase, thus only monitoring for a particular type of action during this period, in this instance, recording notes.

The recorded segment can range from anything desirable to the user speaking the message, where example usage may comprise action items (e.g., "Action item: (recording): call vendor for pricing") or important notes (e.g., "Important note: (recording): competitor has released their product early"), etc. During the subsequent audio stream 415, additional action-inducing phrases may also be used (monitored, detected, and then acted upon). For instance, certain initial phrases may allow other additional phrases to be used (for sub-actions), such as assigning a date/time to an item/note, or a particular owner (e.g., a person/attendee responsible for the item/note, not necessarily an attendee of the session). For example, action items may include a task and an assignment of ownership (e.g., "Action item: (recording): call vendor for pricing. Owner (sub-action keyword): John Doe"). An indication (e.g., sound, image, etc.) may also be used to notify the users/participants that the sub-action has been noted.

The recorded segment 415 may cease in response to a selected impetus. Illustratively, one or more of the following may signal the end of the recorded segment: a predefined length of time corresponding to the action-inducing phrase (e.g., different times for each type of action); a predefined length of time without detected speech (i.e., a pause); or a subsequent predefined cease-recording phrase (a sub-action, as noted above, e.g., "cease item" or "end recording," etc.). Again, an indication may be used to signal the end of the recorded segment.

The recordings 500 may be the audio stream recorded (stored), or may be any information obtained from the session segment following detection of the action-inducing phrase. For instance, as shown in FIG. 5, the recordings 500 may comprise one or more various fields of information, as alternatives to or in addition to the actual recorded audio stream. For example, the recording may be the audio clip, recorded video, slides currently on screen, related text, or simply highlights (e.g., links/pointers) to information present in the meeting during the recorded segment. Specifically, the following represent example information that may be "recorded:"

audio recordings of recorded segments;
video recordings of recorded segments;
certain presented images shown during recorded segments (e.g., screen shots of shared displays/desktops, shared applications, etc.);
presented slides of recorded segments (e.g., links to the slides, page numbers of the slides, the actual slides, images of the slides, etc.);
presented documents of recorded segments (e.g., text documents, word processing documents, etc., from the pages and/or text shown during the recording, or the entire document, or pointers to the documents);
transcribed text from speech of recorded segments (e.g., through transcription process 247); and
typed text of recorded segments (e.g., text typed in chat sessions, note pages, shared documents, etc.).

Other information may be used to populate the report, such as pointers to the information presented during recorded segments, lists of current attendees, lists of current sub-sessions, date/time of day, participant saying the action-inducing phrase (e.g., based on a "who is talking" determination, as may be understood), etc. In one or more embodiments herein, a subsequent predefined action-inducing phrase may be used to direct the recording to a specified type of presented material. For example, a participant may speak the following, with the results in parentheses (and an illustrative recording 500 of which shown in FIG. 5):

"Action item." (recording, return audible confirmation);
"Get these files from counsel. Record image." (take image of screen);
"Owner: John Doe." (set owner of action item to John Doe);
"Cease action item" or simply stop talking for a pause (end recording and action item, return audible confirmation).

Figures 6A, 6B:
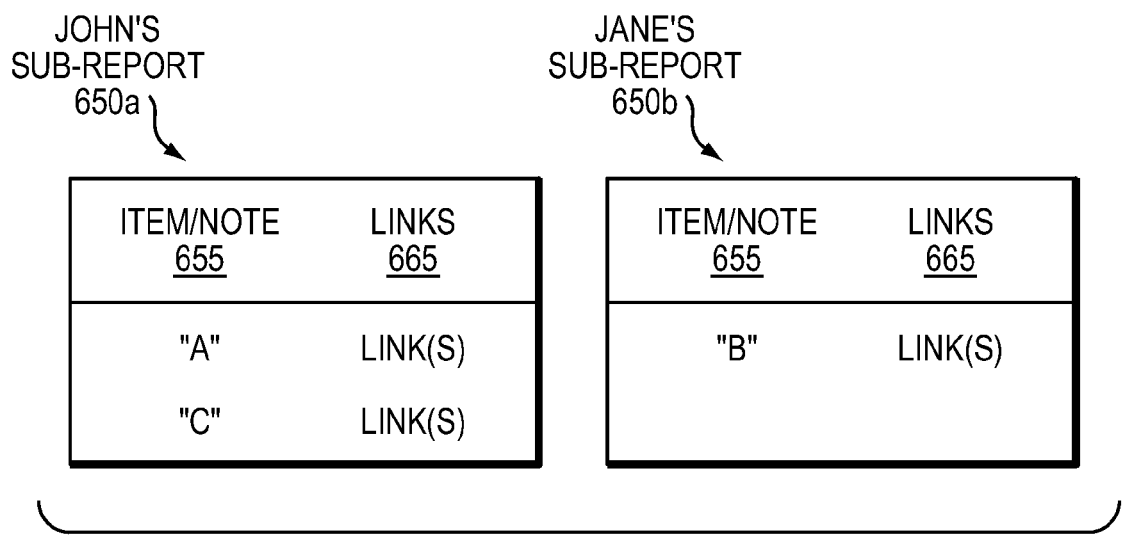
FIGS. 6A-B illustrate example reports.

Throughout the course of the session, action-inducing phrases may be spoken and detected, creating as many recordings 500 as desired by the meeting participants. Either at the end of the session, or real-time during the session (e.g., after each new recording is created), a report 600 may be generated (or amended) of those recordings. The reports 600 may simply be a listing of the recordings 500 or a database containing the recordings in an unorganized (e.g., other than chronologically) fashion. Illustratively, however, the report may be configured as a more organized and more dynamic creation, such as shown in FIG. 6A. For instance, the report may contain the items/notes 605, respective owners 610, various links to information 615, etc. Depending upon configuration, the items/notes 605 or links 615 may be populated with the audio/video recordings, slides, images, documents, text, etc., or the links/pointers thereto. For example, a note "A" may comprise the transcribed text "call vendor about these problems," an owner of John, and a link to the audio file and images shown during the recorded note. John could then see the action item to call the vendor, as well as the images regarding which items to call the vendor about, and a link to the audio clip of the attendee's voice who said the note. By hearing the note, John may be able to pick up on subtle nuances not available in text form, such as a sarcastic tone of the word "problems" that had John not been in the meeting (or could not remember the tone from the meeting), John might have missed the actual sentiment of the action item speaker.

In addition, the report 600 may be a universal report viewable by anyone, only attendees of the session, a limited number of attendees, or only owners of at least one item. Further, it may be desirable to generate sub-reports 650 (FIG. 6B) for each owner (again, accessible by anyone, attendees, limited attendees, or the owners themselves). For instance, owner "John" may have a sub-report 650a populated with items 655 "A" and "C" and links 665 thereto (note that the owner field 610 of report 600 is not is necessary in a sub-report configured in this manner). Owner "Jane," on the other hand, may have a sub-report 650b with only item "B" and its links. In the event that no owner is assigned to an item/note, or a group of owners (e.g., all participants), then such items/notes may appear in multiple sub-reports 650, accordingly.

The generated report 600 (or 650) may be accessed either during the session (when created real-time) or after completion of the session (e.g., as desired, or when the report is generated post session). For example, one feature available from the dynamically generated reports is that at the end of a session/meeting, but before its actual conclusion, the participants may revisit the recordings 500 of the report 600 and edit them (e.g., an "edit" phrase while hearing the playback), or amend them, such as by assigning owners to each (or at least certain) recorded segments/notes in the report. Assume, for instance, that during the meeting, three action items were created. At the end of the meeting, it may be helpful to revisit those action items, and to assign an owner to each (e.g., an "owner" phrase as a dynamic ownership assigning procedure, or simply being able to type in manually the ownership to the report). Note that when ownership changes within the report 600, the sub-reports 650 may also be changed accordingly, adding or removing notes from owner-specific sub-reports.

After completion of the session, the report may be dynamically relayed, e.g., emailed (such as based on attendee lists or other address lists), to certain participants. In particular, in addition to being accessibly by the participants, the reports 600 may be sent directly to the participants as a summary of recorded segments (action items, important notes, etc.). For example, by determining particular owners of each segment in the report, sub-reports 650 may be sent to each corresponding participant (e.g., emailing, to each particular owner only those recorded segments corresponding to that owner). The notification (e.g., email) may contain the entire report, such as the recorded segments, or links/pointers to the actual recorded segments, as described above (i.e., the reports and the notification/emails may, but need not, contain the same information).

Additionally, in certain embodiments, the generated report 600 (650) may be integrated with one or more scheduling management applications 247, on the client is device generating the report 600, or through transmission to the client devices of the corresponding owners (reports 650). In other words, the enhanced meeting note-taking features herein can also integrate with action item or "to do" management applications and input data that is derived from the techniques above. For example, a participant "Jane" may own an action item to call for pricing on the first day of the month, and her calendar may be dynamically populated with the action item and description, e.g., a link to the recording or (a portion of) the transcribed text thereof, for that date.

Notably, while it has been shown that the monitoring/recording process 246 (or transcription process 247) is executed on a client device of the session, it is also possible to have the servers 130 perform the services, accordingly. For example, the servers may monitor the audio, or may be instructed by a client device (in response to detecting the predefined action-inducing phase) to record the subsequent segment. In this latter instance, the recordings 500 may be stored at the server, and thus the server may generate the report(s) 600 as well. Transcription may also take place at the servers, rather than at the client devices.

Further, while it has been shown that the monitoring takes place real-time during the session, the entire audio stream of the session may be recorded (e.g., at a server or otherwise), and then the monitoring and "recording segments" can take place after completion of the session (or otherwise delayed from real-time processing). As such, the "recorded segments" are portions of the previously recorded session, and need not be re-recorded. Moreover, where the entire session is recorded, the recorded audio stream may be converted into text (transcribed), such that "monitoring" for the particular phrases is performed by searching the text for keywords that indicate the action-inducing phrase. That is, where the action-inducing phrases appear in text (e.g., "Action item" textually), then the subsequent words afterward (e.g., for a length of time corresponding to the spoken words, or until an end phrase, such as "cease item" textually).

Figure 7:
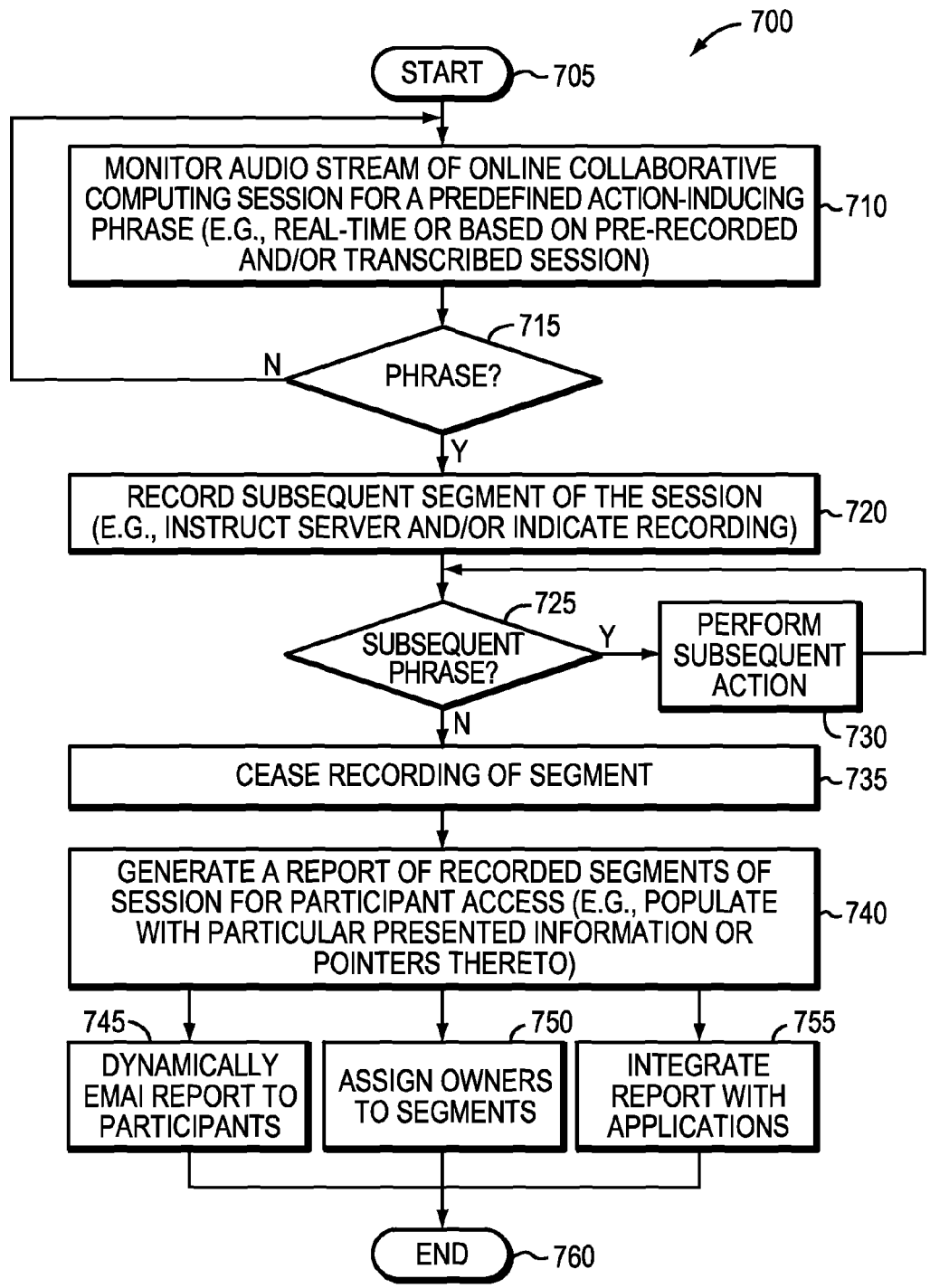
FIG. 7 illustrates an example procedure for automated and efficient note taking for online collaborative computing sessions.

FIG. 7 illustrates a simplified example procedure for automated and efficient note taking for online collaborative computing sessions in accordance with one or more embodiments described herein. The procedure 700 starts at step 705 (e.g., by participating in an online collaborative computing session), and continues to step 710, where an audio stream 400 of online collaborative computing session may be monitored for a predefined action-inducing phrase 405. For example, as mentioned above, the monitoring may be performed in real time during the course of the meeting, or may based on a pre-recorded and/or transcribed session. When the phrase is detected in step 715, i.e., when an attendee of the meeting says the action-inducing phrase, then in step 720 the subsequent segment 415 of the session is recorded (e.g., by the detecting device or by instructing a 130 to perform the recording). Also, as noted, whether the session is being recorded may be indicated, e.g., visually or otherwise, to the attendees of the session. In the event that a subsequent action-inducing phrase is detected during the recorded session (such as date/time, owner, etc.) at step 725, then in step 730 the corresponding subsequent action may be performed or noted, accordingly.

In step 735, the segment recording is ceased (resulting in a recording 500), such as in response to a timer, detection of a pause, or a specific phrase (step 725/730). A report 600 may then be generated in step 740 such that participants of the session may access the recorded segments. For instance, as described above, the reports may be populated with particular presented information or pointers thereto, and may be accessed either during an ongoing session, or afterward. Once the report is generated, various actions may be performed. For example, in step 745, the report (e.g., sub-reports 650) may be dynamically emailed to (select) participants. Alternatively or in addition, in step 750, the participants may go back through the report (e.g., at the end of a meeting) and assign owners to each recorded segment, e.g., manually or through a dynamic ownership assigning procedure. Also, in step 755, the reports may be integrated with various applications, such as scheduling management applications 244, etc. The procedure 600 ends in step 660, e.g., with participants able to access the reports 600 and recorded segments 500 as desired (e.g., to revisit the important notes at a later time).

Advantageously, the novel techniques described herein provide for automated and efficient note taking for online collaborative computing sessions. By monitoring for specific spoken keywords during an online session/meeting, the novel techniques allow for dynamic note taking of action items or important notes, as well as defining a particular owner for those items/notes. In particular, the techniques described above advantageously transmit the notes to the attendees/owners automatically (based on configuration), and include the actual audio/video/text/etc. of the meeting at the time the note was taken. Accordingly, the techniques above increase productivity during online collaborative computing sessions through automation, and alleviate human errors in scribing/translating meeting minutes or action items and corresponding ownership of those particular notes.

While there have been shown and described illustrative embodiments that provide for automated and efficient note taking for online collaborative computing sessions, it is to be understood that various other adaptations and modifications may be made within the spirit and scope of the embodiments herein. For example, the embodiments have been shown and described herein using specific example action-inducing phrases, in particular orders, with particular outcome. Such phrases are in no way meant to limit the scope of the embodiments herein, and are merely representative examples that may be configured by system developers. Also, the embodiments have been shown for use with online collaborative computing sessions. However, the embodiments of the embodiments in their broader sense are not so limited, and may, in fact, be used with any relevant online applications with an audio stream that may be monitored, and a reason to record certain notes during the audio stream. For example, telepresence conferences, videoconferences, and phone conversations that are capable of being monitored (e.g., smartphones, IP-phones, etc.) may utilize the techniques herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    participating in an online collaborative computing session;
    monitoring, by a computer process associated with the session, an audio stream of the session for a predefined action-inducing phrase;
    recording, in response to the phrase, a subsequent segment of the session, wherein the recorded segment comprises at least one of video, one or more images and textual content being shared by one or more participants within the session; and
    generating reports of any recorded segments of the session, wherein the generated reports include at least a first report specific for a first participant and a second report specific for a second participant, wherein the first report comprises information pertaining to a first subset of the recorded segments of the session and the second report comprises information pertaining to a second subset of the recorded segments of the session.

2. The method as in claim 1, further comprising:
    dynamically emailing a generated report to one or more participants of the session after conclusion of the session.

3. The method as in claim 1, further comprising:
    populating each report with presented information selected from a group consisting of: an audio recording of one or more recorded segments; a video recording of one or more recorded segments; one or more presented images of one or more recorded segments; one or more presented slides of one or more recorded segments; one or more presented documents of one or more recorded segments; transcribed text from speech of one or more recorded segments; and typed text of one or more recorded segments.

4. The method as in claim 1, further comprising:
    populating each report with pointers to information presented during one or more recorded segments.

5. The method as in claim 1, further comprising:
    ceasing recording of a segment in response to impetus selected from: a predefined length of time corresponding to the action-inducing phrase; a predefined length of time without detected speech; or a subsequent predefined cease-recording phrase.

6. The method as in claim 1, further comprising:
    monitoring the audio stream during a recorded segment for a subsequent predefined action-inducing phrase.

7. The method as in claim 6, wherein the subsequent predefined action-inducing phrase is directed to an action selected from: specifying an owner of the recorded segment; specifying a date or time; and specifying a type of presented material to record.

8. The method as in claim 1, wherein the process is executed on a client device of the session.

9. The method as in claim 8, further comprising:
    in response to detecting the predefined action-inducing phase by the process executed on the client device, instructing a server of the session to record the subsequent segment, wherein the server generates the reports.

10. The method as in claim 1, wherein the process is executed on a server of the session.

11. The method as in claim 1, further comprising:
    accessing the generated reports either during the session or after completion of the session.

12. The method as in claim 1, wherein monitoring takes place real-time during the session.

13. The method as in claim 1, further comprising:
    recording the audio stream of the session, wherein monitoring and recording segments take place after completion of the session.

14. The method as in claim 13, further comprising:
    converting the recorded audio stream into text, wherein monitoring is performed by searching the text for keywords indicative of the action-inducing phrase.

15. The method as in claim 1, further comprising:
    accessing, by participants of the session, the generated reports; and
    assigning owners to each recorded segment in the generated reports.

16. The method as in claim 1, further comprising:
    integrating the generated reports with one or more scheduling management applications.

17. The method as in claim 1, further comprising:
    providing an indication during the session that action-inducing phrase was detected and that recording the subsequent segment is taking place.

18. The method of claim 1, wherein the generating the reports comprises:
    generating a report that lists a plurality of segments recorded during the session including at least one owner and a link associated with each recorded segment, and each link provides access to the corresponding recorded segment; and generating a sub-report for each owner associated with a recorded segment, each sub-report providing a listing of recorded segments and corresponding links for the recorded segments associated with a corresponding owner.

19. A non-transitory computer-readable media having software encoded thereon, the software when executed operable to:

participate in an online collaborative computing session;

monitor an audio stream of the session for a predefined action-inducing phrase;

record, in response to the phrase, a subsequent segment of the session, wherein the recorded segment comprises at least one of video, one or more images and textual content being shared by one or more participants within the session; and generate reports of any recorded segments of the session, wherein the generated reports include at least a first report specific for a first participant and a second report specific for a second participant, and the first report comprises information pertaining to a first subset of the recorded segments of the session and the second report comprises information pertaining to a second subset of the recorded segments of the session.

20. The non-transitory computer-readable media as in claim 19, wherein the software when executed is further operable to:

dynamically email the reports to one or more participants of the session after conclusion of the session.

21. The non-transitory computer-readable media as in claim 19, wherein the software when executed is further operable to:

populate the reports with presented information selected from a group consisting of: an audio recording of one or more recorded segments; a video recording of one or more recorded segments; one or more presented images of one or more recorded segments; one or more presented slides of one or more recorded segments; one or more presented documents of one or more recorded segments; transcribed text from speech of one or more recorded segments; typed text of one or more recorded segments; and pointers to information presented during one or more recorded segments.

22. The non-transitory computer-readable media as in claim 19, wherein the software when executed is further operable to:

cease recording of a segment in response to impetus selected from: a predefined length of time corresponding to the action-inducing phrase; a predefined length of time without detected speech; or a subsequent predefined cease-recording phrase.

23. The non-transitory computer-readable media as in claim 19, wherein the software when executed is further operable to:

monitor the audio stream during a recorded segment for a subsequent predefined action-inducing phrase.

24. The non-transitory computer-readable media as in claim 19, wherein the software when executed is further operable to:

instruct a server of the session to record the subsequent segment and generate the reports in response to detecting the predefined action-inducing phase.

25. The nontransitory computer-readable media as in claim 19, wherein the software when executed is further operable to:

generate a report so as to comprise a listing of a plurality of segments recorded during the session including at least one owner and a link associated with each recorded segment, and each link provides access to the corresponding recorded segment;

generate a sub-report for each owner associated with a recorded segment, each sub-report providing a listing of recorded segments and corresponding links for the recorded segments associated with a corresponding owner.

26. A method, comprising:

participating in an online collaborative computing session;

monitoring, by a computer process associated with the session, the session for a predefined recording-inducing action;

recording, in response to the action, a subsequent segment of the session, wherein the recorded segment comprises at least one of video, one or more images and textual content being shared by one or more participants within the session; and generating reports of any recorded segments of the session, wherein the generated reports include at least a first report specific for a first participant and a second report specific for a second participant, and the first report comprises information pertaining to a first subset of the recorded segments of the session and the second report comprises information pertaining to a second subset of the recorded segments of the session.

27. The method as in claim 26, wherein the predefined recording-inducing action is a spoken phrase within an audio stream during the session.

28. The method of claim 26, wherein the generating the reports comprises:

generating a report that lists a plurality of segments recorded during the session including at least one owner and a link associated with each recorded segment, and each link provides access to the corresponding recorded segment; and generating a sub-report for each owner associated with a recorded segment, each sub-report providing a listing of recorded segments and corresponding links for the recorded segments associated with a corresponding owner.

29. An apparatus, comprising:

one or more network interfaces adapted to communicate over a computer network;

a processor coupled to the network interfaces and adapted to execute one or more processes; and a memory configured to store a process executable by the processor, the process when executed operable to:

participate in an online collaborative computing session;

monitor an audio stream of the session for a predefined action-inducing phrase;

record, in response to the phrase, a subsequent segment of the session, wherein the recorded segment comprises at least one of video, one or more images and textual content being shared by one or more participants within the session; and generate reports of any recorded segments of the session, wherein the generated reports include at least a first report specific for a first participant and a second report specific for a second participant, wherein the first report comprises information pertaining to a first subset of the recorded segments of the session and the second report comprises information pertaining to a second subset of the recorded segments of the session.

30. The apparatus of claim 29, wherein the process when executed by the processor is further operable to:

generate a report so as to comprise a listing of a plurality of segments recorded during the session including at least one owner and a link associated with each recorded segment, and each link provides access to the corresponding recorded segment;

generate a sub-report for each owner associated with a recorded segment, each sub-report providing a listing of recorded segments and corresponding links for the recorded segments associated with a corresponding owner.

* * * * *